Nov. 12, 1968 A. R. KRASBERG 3,410,778
ELECTROCHEMICAL SENSING DEVICE AND METHOD OF MAKING SAME
Filed Feb. 16, 1965 2 Sheets-Sheet 1
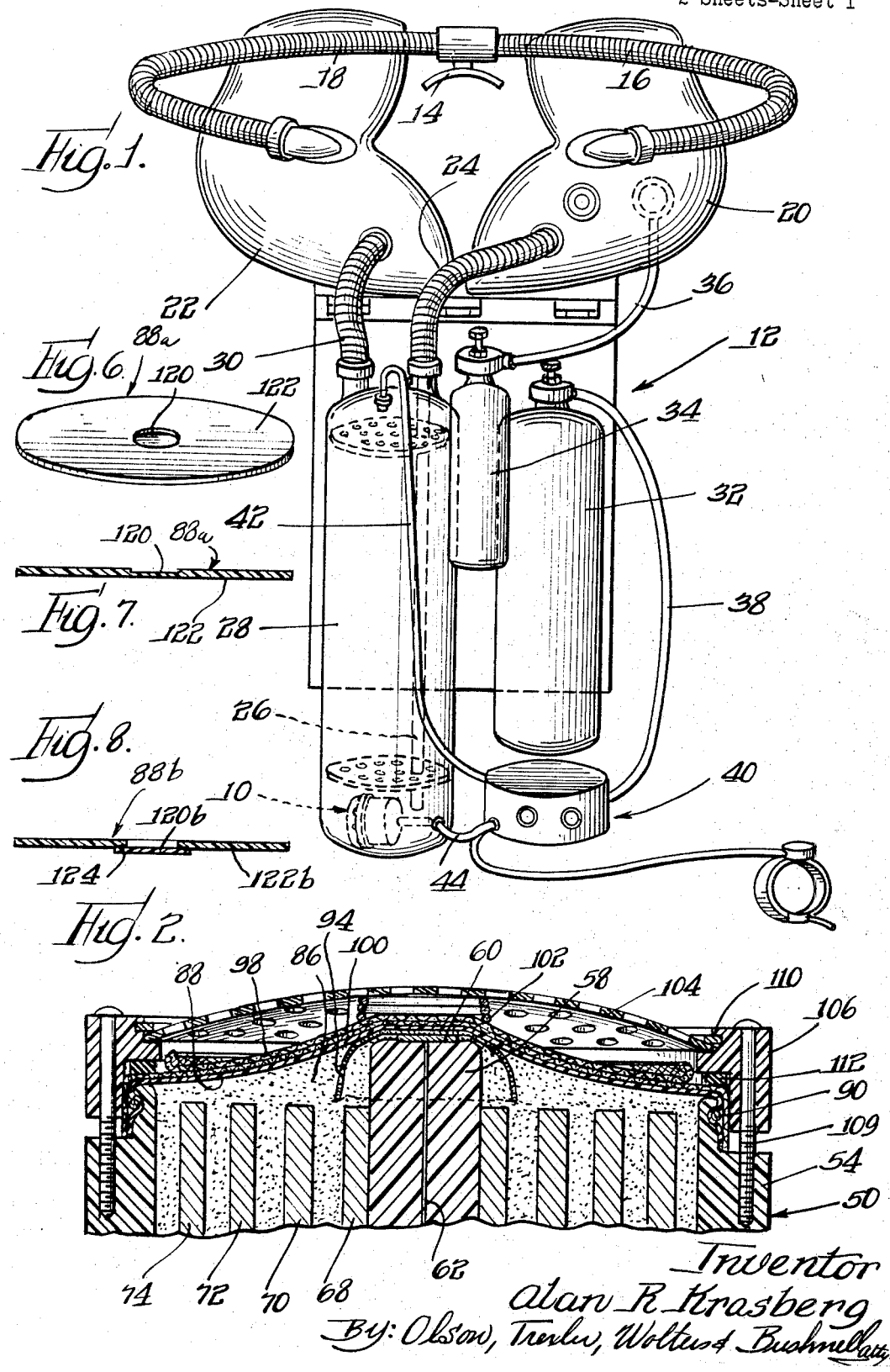
Inventor
Alan R. Krasberg
By: Olson, Trexler, Wolters & Bushnell attys Nov. 12, 1968     A. R. KRASBERG     3,410,778
ELECTROCHEMICAL SENSING DEVICE AND METHOD OF MAKING SAME
Filed Feb. 16, 1965     2 Sheets-Sheet 2
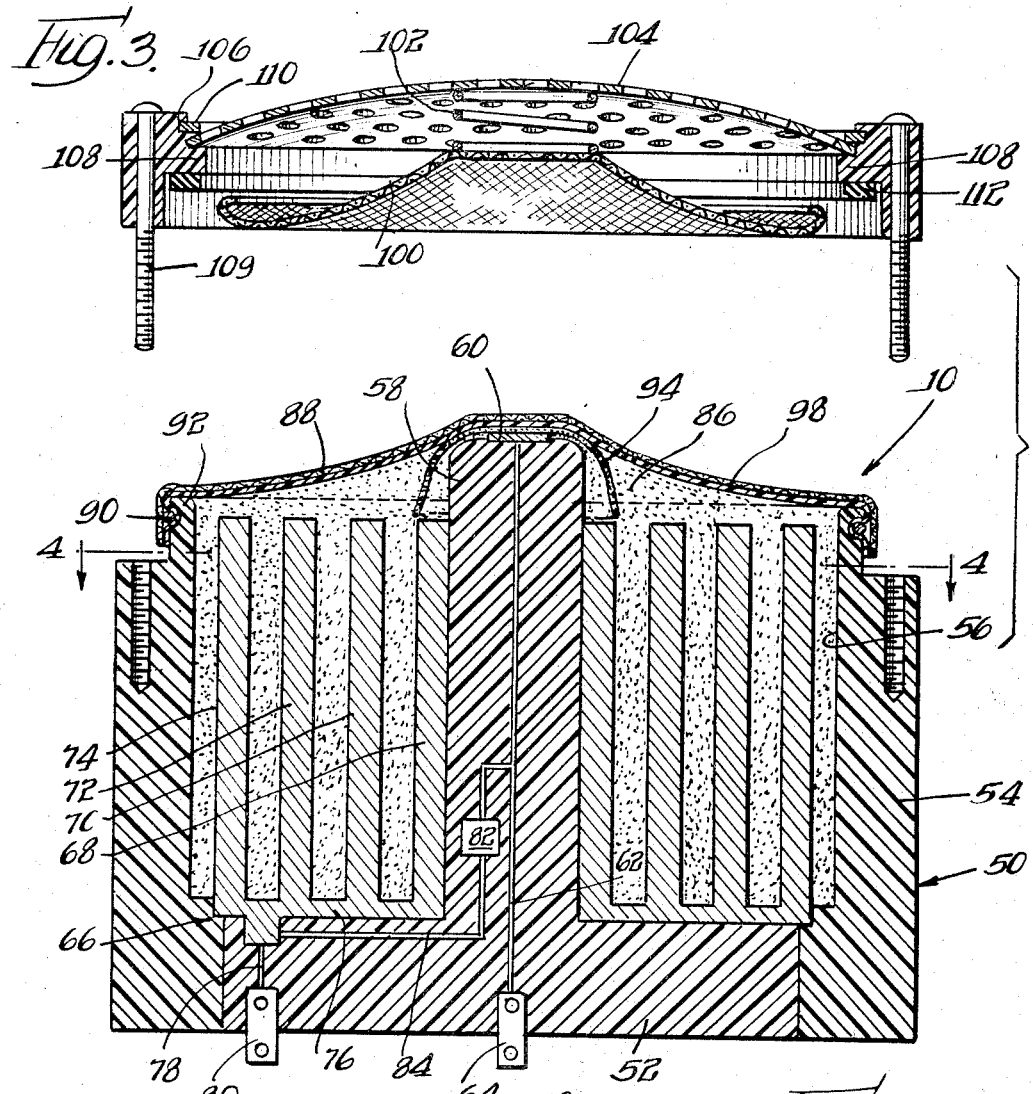
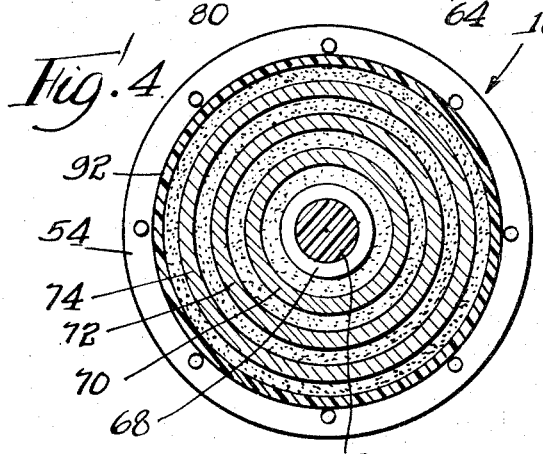
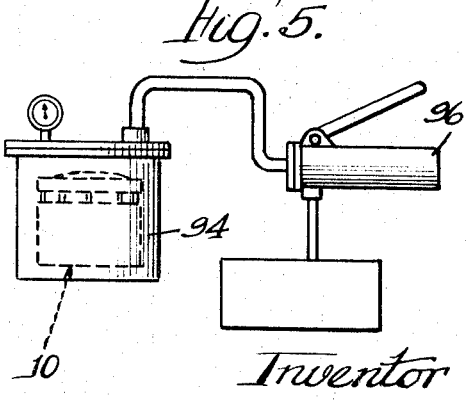
Inventor
Alan R. Krasberg
By: Olson, Trexler, Wolters & Bushnell
attys.

United States Patent Office 3,410,778
Patented Nov. 12, 1968

3,410,778
ELECTROCHEMICAL SENSING DEVICE AND METHOD OF MAKING SAME
Alan R. Krasberg, Glenview, Ill.
(% J. H. Emerson Company, Cambridge, Mass. 02138)
Filed Feb. 16, 1965, Ser. No. 432,967
11 Claims. (Cl. 204—195)

ABSTRACT OF THE DISCLOSURE

There is disclosed an electrochemical cell having electrodes immersed in an electrolyte material and covered by an oxygen permeable membrane and a method of producing the cell by applying pressure to and maintaining pressure on the electrolyte material so as to eliminate gas bubbles and bubble nuclei from the material.

---

The present invention relates to a novel electrochemical cell and method of making the same and more specifically, to a novel polarographic electrode.

While various uses for the electrochemical cell or polarographic electrode contemplated herein will become apparent, the device is particularly suitable for sensing the presence of oxygen in fluids or gases and providing an indication thereof. Furthermore, the device is particularly adapted to be used under widely varying pressure conditions and it may, for example, be used in an oxygen control system for a diver such as contemplated in my copending application, Ser. No. 234,781 filed Nov. 1, 1962, now abandoned.

It is an important object of the present invention to provide a novel electrochemical cell or polarographic electrode device for sensing the amount of oxygen present in a fluid and a novel method of making the same whereby to obtain a more accurate and reliable response to the presence of oxygen.

A more specific object of the present invention is to provide a novel sensing device of the above described type and method of making the same whereby the device is provided with greater reliability and stability and a longer useful life even when subjected to operation in fluids under widely varying pressures.

Other objects and advantages of the present invention will become apparent from the following description and the accompanying drawings wherein:

FIG. 1 is a simplified view showing a diving apparatus of a type utilizing a sensing device incorporating features of the present invention;

FIG. 2 is an enlarged sectional view showing an electrochemical cell or polarographic electrode sensing device incorporating features of the present invention;

FIG. 3 is an exploded sectional view showing a polarographic electrode sensing device incorporating features of the present invention;

FIG. 4 is a sectional view on a reduced scale taken along line 4—4 in FIG. 3;

FIG. 5 is a simplified view of an apparatus used in processing the sensing device in accordance with a feature of the present invention;

FIG. 6 is a perspective view on a reduced scale of a modified cover member;

FIG. 7 is a sectional view of the modified membrane structure shown in FIG. 6; and FIG. 8 is a sectional view similar to FIG. 7 but showing a further modified membrane or cover structure.

Referring now more specifically to the drawings wherein like parts are designated by the same numerals throughout the various figures an electrochemical cell or polarographic electrode sensing device incorporating features of the present invention is shown best in FIGS. 2–4. The sensing device is adapted for use in a wide variety of installations for controlling the atmosphere and particularly the oxygen content and may, for example, be used in underwater diving apparatus or chambers or living quarters, in decompression or other pressure chambers, in operating rooms or chambers, in baby incubators, and in space capsules. One diving apparatus 12 of a type in which the sensing device 10 may be used is shown in FIG. 1. This diving apparatus need only be generally shown and described herein and for a more detailed disclosure of such an apparatus reference is made to my above mentioned copending application. The diving apparatus comprises means providing a gas circuit having a mouthpiece 14 or other suitable means for communicating with the respiratory system of a diver wearing or utilizing the apparatus. The mouthpiece 14 is connected by hoses 16 and 18 with flexible or collapsible breathing bags 20 and 22 respectively. The bag 20 is connected by hose 14 and conduit 26 with a canister 28 filled with a suitable material for removing carbon dioxide from the gas, and the canister is also connected by hose 30 with the bag 22.

The apparatus 12 includes means for supplying oxygen and inert gas to the previously described gas circuit. This means includes a container 32 for oxygen and a container 34 for inert gas. The inert gas container is connected directly with the breathing bag 20 by conduit 36 and suitable control valves for controlling the flow of inert gas in accordance with the demand created by changing pressures.

The oxygen container 32 is connected by conduit 38 with a control unit 40 including an electrically controlled valve, not shown, which is described in the aforementioned copending application. The control unit and valve are connected by conduit 42 with the canister 28.

The sensing device 10 is disposed at a suitable location in the gas circuit so as to be exposed to the mixture of oxygen and inert gas. As described in the aforementioned copending application, the device 10 is adapted to provide an electrical signal in accordance with the presence of oxygen in the gas and this signal is transmitted by wires 44 to the control unit 40 for controlling the operation of the valve within the unit.

The polarographic sensing device 10 comprises a body member 50 of a plastic material or other suitable electrical insulating material. The body member may be formed in one or more parts and includes an end wall 52 and an axially extending annular sidewall 54 defining a cavity 56. A central stem 58 is integrally formed with the end wall 52 and extends axially therefrom and preferably axially beyond the end of the sidewall 54 as shown.

A relatively small disc-shaped element 60 is adhesively or otherwise secured to the outer end of the stem 58 and forms the cathode of the cell. The cathode is connected by a wire 62 embedded in the stem 58 with a terminal element 64 projecting from the back of the end wall 52. The cell further includes an anode 66 disposed within the recess 56. The anode is formed so that it has an exposed area which is very large as compared with the exposed area of the cathode for promoting greater linearity and stability in signal output and longer useful life. For example, the area of the anode may be about 500 times the area of the cathode. In the embodiment shown, the anode comprises a plurality of concentric radially spaced cylinders 68, 70, 72 and 74 which are integrally or otherwise joined with a disc-shaped end portion 76 disposed against the end wall 52 of the housing or body member 50. The anode is connected by a wire 78 with a terminal element 80 projecting from the back of the body member end wall 52.

The anode and the cathode may be formed from a variety of known materials and combinations of materials may be used so that the cell is either self-biasing or requires the application of an electrical bias from an external source of power. For example a platinum cathode and silver anode may be used as in the aforementioned copending application. However, the cell is preferably constructed so as to be self-biasing for obtaining a more accurate and reliable signal. In order to accomplish this, the cathode may, for example, be formed from gold and the anode may, for example, be formed from cadmium. In order further to enhance the reliability of the signal and compensate for variations in temperature to which the cell may be subjected, a temperature compensating thermistor 82 is embedded in the plastic of the body member and connected by a wire 84 between the anode and the cathode lead or wire 62.

The voids within the recess or cavity 56 of the body member and surrounding the cylindrical portion of the anode are completely filled with electrolyte material 86, which material also extends up over the top of the stem 58 and the cathode 60. The electrolyte material 86 may be of various known chemical compositions suitable for use with the materials of the anode and the cathode. However, it is noted that the electrolyte material is in the form of a semi-solid gel. It has been found that this feature minimizes leakage and evaporation and reduces variations in the signal provided by the cell when the cell is subjected to mechanical shocks, vibrations or acceleration forces. Furthermore, the electrolyte material 86 preferably includes an anti-freeze such as ethylene-glycol so that the cell may be utilized under widely varying temperature conditions. As an example only, the electrolyte material may include about ten percent KCL and about one percent agar in a half and half composition of water and ethyleneglycol.

The electrolyte material 86 is confined by a cover or membrane 88 which is permeable to oxygen and has the characteristic of permitting oxygen to pass therethrough at a rate substantially directly proportional to the partial pressure of the oxygen in the gas mixture to which the device 10 is exposed. The cover or membrane 88 may be formed from various materials such as polyethylene and, for a purpose discussed more fully below, is preferably formed from a material and in a manner or with a thickness so as to provide substantial resistance to cold flow under pressure or tension. A polytetrafluoroethylene material has been found to be especially suitable for this purpose. The membrane or covering 88 is secured by an elastic band 90 or other suitable means around the upper margin 92 of the sidewall 54.

The membrane 88 is stretched over the top of the stamp 58 so that it is under tension and tends to press down against the exposed surface of the cathode 60 and against the electrolyte material. A slight space is maintained between the membrane and the cathode. This is accomplished by positioning a spacer 94 between the membrane and the cathode so as to mechanically insure the desired separation. This spacing reduces possible effects resulting from leakage, evaporation and mechanical shocks and increases the life of the device. The spacer 94 is formed so that oxygen that passes through the membrane may also readily pass through the spacer into association with the cathode. It has been found, for example, that a thin piece of cotton fabric saturated with the electrolyte material is suitable for use as the spacer 94. The element 94 not only serves as a spacer but also extends downwardly into the body of the electrolyte material and acts as a wick for insuring saturation of the element 94 and thus contact of the electrolyte material with the cathode 60. This insures completion of the internal electrical circuit of the sensing device even in the event of the loss by evaporation or otherwise of some of the electrolyte material.

One problem which has been encountered with devices of the general type contemplated herein is the formation of gas bubbles in the electrolyte material, which bubbles ultimately prevent the device from functioning reliably in the desired manner. Such bubbles tend to form and grow relatively rapidly when the device is subjected to varying pressures such as when the device is used in diving equipment so that the useful working life of the sensing device is significantly shortened.

In accordance with a feature of the present invention the sensing device is processed during manufacture thereof in a manner so as substantially to eliminate or minimize any tendency for bubbles to form and expand in the electrolyte material during subsequent use of the device and even when the device is repeatedly subjected to varying pressures. More specifically, the electrolyte material in the finished device is substantially free of any air or gas bubbles and gas bubble nuclei which are normally inherently present in the material in the absence of processing material in the manner described below. Such normally present bubbles or bubble nuclei, even though they are initially tiny and have no adverse effect on the device, provide nucleus for the forming or growing of larger bubbles during subsequent use of the sensing device. However, with the electrolyte material in the device of the present invention having substantially no bubbles or bubble nuclei, there are substantially no nucleus for the formation of and the growing of larger bubbles during use.

In order to eliminate the bubbles and bubble nuclei from the electrolyte material, the device is subjected to positive unyielding hydraulic pressure usually after the electrolyte material has been covered and sealed within the cavity 56 by the membrane 88. The hydraulic pressure may be applied to the device by means of various apparatus. For example, the device 10 may be placed within a pressure vessel 94 as shown in FIG. 5. The vessel is then completely filled with an incompressible hydraulic fluid delivered by a positive displacement pump 96 or other suitable pressure applying means. By applying such hydrostatic compression with a pressure at least equal to several atmospheres, the gases in any bubbles which may be entrapped in the electrolyte material are dissolved into the material so that such bubbles and bubble nuclei are substantially completely eliminated. Then the surface tension of the electrolyte material is sufficient to prevent such bubbles from reforming even after the device is removed from the pressure container 94.

While the treatment of the electrolyte material in the above described manner substantially eliminates or reduces any possibility of the formation of damaging bubbles in the electrolyte material, it is contemplated that further assurance against the formation of such bubbles be provided by maintaining pressure on the electrolyte material. In order to accomplish this function, the sensing device 10 is constructed so as to maintain a pressure on the covering member or membrane 88 and thus on the electrolyte material.

As shown in FIGS. 2 and 3, the sensing device 10 includes a relatively flexible screen 98 which extends over and supports and protects the membrane 88. The screen 98 is, of course, porous so that the oxygen in the fluid being monitored may readily pass therethrough. A relatively heavy pressure transmitting screen 100 overlies the screen 98 and is pressed thereagainst by a spring 102. The spring 102 is confined by a relatively heavy perforated grid 104 which serves not only to restrain the spring but also to protect the outer end of the sensing device. The spring and tension in the membrane function to maintain a positive pressure on the electrolyte in excess of the atmospheric or environmental pressure to which the cell is subjected.

The grid 104 is assembled with an adapter ring 106 which is removably secured to the sidewall 54 of the body member 50 around the reduced diameter portion 92 thereof by a plurality of screws 109. The adapter ring has an annular shoulder 108 which supports the circular margin of the grid 104. A snap ring 110 serves to retain the grid against the shoulder 108. Preferably a gasket 112 is disposed beneath the shoulder 108 for clamping engagement with marginal portions of the screen 98 and membrane 88 and preventing margins of these elements from being pulled inwardly under the influence of the pressure applied by the spring 102.

The covering member or membrane 88 of the structure described above is of generally uniform thickness throughout. As previously indicated the thickness is small so as to facilitate the passage of oxygen therethrough and to the vicinity of the cathode 60. While this structure has provided excellent results, some loss of the electrolyte material as result of evaporation through the membrane has been experienced. Such evaporation may be reduced by coating an annular marginal area of the membrane with a suitable substance not shown, impermeable to the liquids of the electrolyte while leaving a relatively small central area of the membrane adjacent the cathode 60 uncoated. In addition FIGS. 6, 7 and 8 show modified covering members or membrane structures 88a and 88b which may be incorporated in the sensing device in place of the previously described membrane 88 so as to reduce and minimize the evaporation of the electrolyte material and thereby further increase the working life of the sensing device.

The membrane or covering member 88a of FIGS. 6 and 7 is preferably formed in one piece from any of the previously mentioned plastic materials. This membrane has a central portion 120 and an annular marginal portion 122. The central portion 120 has a thickness similar to or even less than the thickness of the membrane 88 described above and sufficiently small to facilitate passage of the oxygen therethrough and to the vicinity of the cathode 60. The central portion 120 has a diameter similar to the diameter of the cathode 60 and is adapted to be assembled so as to be in substantial alignment with the cathode 60. The annular marginal portion 122 is of increased thickness and thereby provides increased resistance of the evaporation of moisture from the electrolyte material. While the marginal portion 122 is of increased thickness and retards or prevents evaporation therethrough, it is preferably formed so as to be sufficiently flexible to permit the electrolyte material to be maintained under pressure in the manner described above.

The membrane structure 88b also includes a central disc-shaped plastic portion 120b which is relatively thin and permits the passage of oxygen therethrough to the cathode 60. In this embodiment the marginal portion 122b of the membrane structure is formed separately from the central portion 120b and is adhesively or otherwise sealed thereto at 124. The marginal portion 122b may be formed from relatively thick plastic or may be formed from other sheet material which has electrical insulating characteristics and is impervious to moisture. The marginal portion 122 is also preferably sufficiently yieldable or flexible to permit the electrolyte material to be maintained under pressure.

While a preferred embodiment of the present invention has been shown and described herein, it is obvious that many details may be changed without departing from the spirit and scope of the appended claims.

The invention is claimed as follows:

1. An electrochemical cell for sensing a component of a fluid comprising an electrolyte material having substantially any gases entrapped therein in solution and being substantially free of gas bubbles substantially throughout the entire body thereof, a cathode and an anode immersed in said electrolyte material, and means confining said electrolyte material including an element selectively permeable to said component of said fluid.

2. An electrochemical cell, as defined in claim 1, wherein said means confining said electrolyte material comprises means maintaining a positive pressure on substantially all of said electrolyte material in excess of the environmental pressure to which the cell is subjected for minimizing any possibility of the formation of gas bubbles within the electrolyte material.

3. An electrochemical cell, as defined in claim 1, wherein said cathode has a first relatively small area exposed to said electrolyte material and said anode has a large area many times that of the cathode exposed to said electrolyte material.

4. An electrochemical cell for providing an electrical signal in response to oxygen present in a fluid comprising an electrolyte material substantially free of gas bubbles and gas bubble nuclei, a cathode and an anode immersed in said electrolyte material, and means confining said electrolyte material and maintaining substantially all of said electrolyte material under a pressure in excess of the environmental pressure to which the cell is subjected, said confining means comprising an element selectively permeable to oxygen.

5. An electrochemical cell for providing an electrical signal in response to the presence of oxygen in a fluid comprising an electrolyte material substantially free of gas bubbles and gas bubble nuclei substantially throughout the entire body thereof, a cathode and an electrode immersed in said electrolyte material, means confining said electrolyte material including a membrane selectively permeable to oxygen adjacent said cathode, and mechanical means between said membrane and said cathode and positively maintaining a predetermined space between said membrane and said cathode.

6. A cell as defined in claim 5, wherein said membrane is yieldable, said cell including spring means acting against said yieldable membrane and applying pressure to said electrolyte material.

7. A cell, as defined in claim 6, which includes a pressure distributing member disposed between said spring means and said membrane, said pressure distributing member having apertures therein for permitting the passage of oxygen therethrough.

8. A polarographic electrode for providing an electrical signal in response to the presence of oxygen in a fluid comprising a semi-solid gel type electrolyte material substantially free of gas bubbles, a body member having a cavity defined by an annular sidewall containing said electrolyte material, a support element disposed in said body member and projecting axially beyond an end of said sidewall, a cathode disposed on an outer portion of said support element, an anode including a plurality of spaced apart cylindrical portions disposed in said cavity between said support element and said sidewall, and covering means extending over said cavity and said electrolyte and secured to said sidewall, said electrolyte extending over said cathode and between said cathode and said covering means, said covering means including a portion selectively permeable to oxygen in the vicinity of said cathode.

9. A method of making an electrochemical sensing cell comprising placing an electrolyte material having gas bubbles entrapped therein and a cathode and an anode in assembled relationship with a body member having a cavity therein, covering said cavity and said electrolyte material, cathode and anode with a yieldable membrane selectively permeable to a component to be sensed, and then subjecting the cell to a positive unyielding pressure and forcing gases in said bubbles into solution in the electrolyte material and substantially eliminating such bubbles from the electrolyte material.

10. A method, as defined in claim 9, which includes a step of immersing said cell in a body of hydraulic fluid, and then creating a positive unyielding pressure in said hydraulic fluid and thereby applying said positive unyielding pressure to the electrolyte material.

11. An electrochemical cell for providing an electrical signal in response to oxygen present in a fluid comprising electrolyte material, a cathode and an anode immersed in said electrolyte material, a membrane selectively permeable to oxygen confining said electrolyte material and means maintaining substantially the entire body of said electrolyte material under a pressure in excess of the environmental pressure to which the cell is subjected for retarding the formation of gas bubbles within the electrolyte material.

References Cited

UNITED STATES PATENTS

| | | | |
|---|---|---|---|
| 3,000,805 | 9/1961 | Carritt et al. | 204—195 |
| 3,071,530 | 1/1963 | Neville | 204—195 |
| 3,206,386 | 9/1965 | Kopito | 204—1.1 |
| 3,211,638 | 10/1965 | Halvosen | 204—195 |
| 3,227,643 | 1/1966 | Okum et al. | 204—195 |
| 3,239,444 | 3/1966 | Heldenbrand | 204—195 |
| 3,272,725 | 9/1966 | Garst | 204—1.1 |
| 3,278,408 | 10/1966 | Leonard et al. | 204—1.1 |
| 3,322,662 | 5/1967 | Mackereth | 204—195 |
| 3,334,039 | 8/1967 | Vlasak | 204—195 |

HOWARD S. WILLIAMS, *Primary Examiner.*

T. TUNG, *Assistant Examiner.*